United States Patent [19]
Wehner et al.

[11] 4,450,444
[45] May 22, 1984

[54] STEPPED FREQUENCY RADAR TARGET IMAGING

[75] Inventors: Donald R. Wehner; Michael J. Prickett, both of San Diego, Calif.

[73] Assignee: The United States of America as represented by the Secretary of the Navy, Washington, D.C.

[21] Appl. No.: 268,501

[22] Filed: May 29, 1981

[51] Int. Cl.³ ............................................. G01S 9/00
[52] U.S. Cl. ............................. 343/5 CM; 343/5 FT
[58] Field of Search ......................... 343/5 FT, 5 CM

[56] References Cited
U.S. PATENT DOCUMENTS 3,885,224  5/1975  Klahr .............................. 343/5 F T
4,339,752  7/1982  Williams et al. ................ 343/5 CM Primary Examiner—Maynard R. Wilbur
Assistant Examiner—M. R. Gordon
Attorney, Agent, or Firm—R. F. Beers; E. F Johnston; Harvey Fendelman

[57] ABSTRACT

An apparatus is disclosed by which radar targets can be imaged in two dimensions for identification at full radar range using relatively moderate speed data processing. Images of targets are found in range and cross-range dimensions from the time history of the targets' wideband spectral response obtained by a frequency stepping radar. A frequency synthesizer generates a series of N identical signal bursts, each burst comprising n pulses and each of said n pulses being a different frequency. The radar echos from this series of bursts is separated into n-phase and quadrature phase components. These components are processed to calculate and store the relative amplitude of each echo signal and to determine the phase of each echo signal relative to the phase of the corresponding transmitted pulse. Further, the echo signals are inverse Fourier Transformed to generate an n×N Fourier Transform array representing a synthetic target range profile. The series of N range profile signatures is Fourier Transformed, range cell by range cell, to obtain the Doppler spectrum for each range cell. The resulting Doppler frequencies in each range cell are proportional to the target's angular rate of aspect change relative to the radar and the scatterer cross-range location in the range cell relative to an arbitrary aspect rotation act.

9 Claims, 12 Drawing Figures

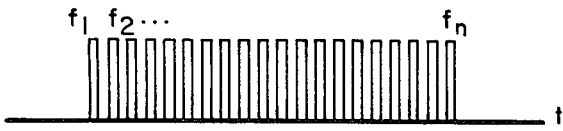

TRANSMITTED WAVEFORM SHOWING A SINGLE BURST. (BURSTS CAN BE CONTIGUOUS OR SEPARATED IN TIME.)

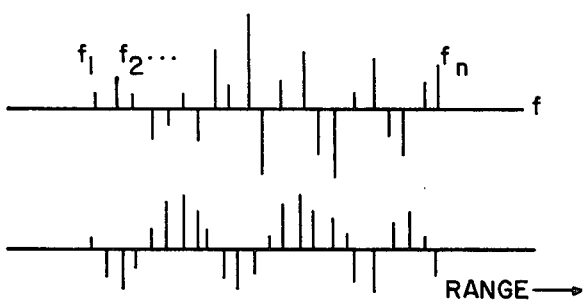

SPECTRAL SIGNATURE OF TARGET. (I OR Q CHANNEL SHOWN)

RANGE PROFILE SIGNATURE OF TARGET OBTAINED BY TAKING $FT^{-1}$ OF DIGITIZED SPECTRAL SIGNATURE (I OR Q CHANNEL SHOWN)

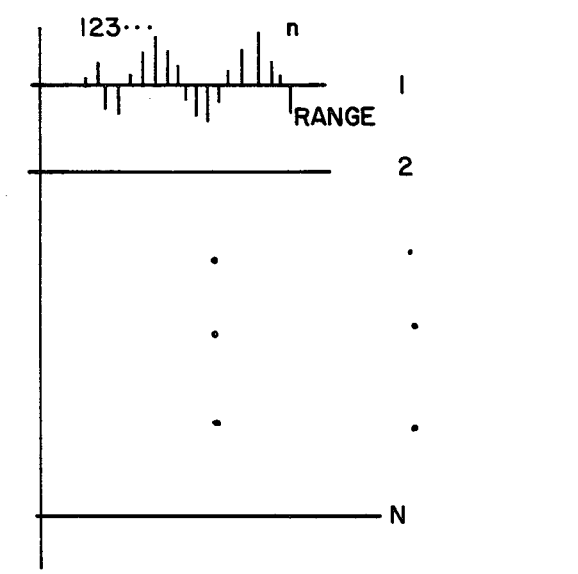

TIME HISTORY OF A SERIES OF RANGE PROFILES, ONE FROM EACH OF A SERIES OF N BURSTS, OBSERVED DURING FRAME TIME, T. (I OR Q CHANNEL SHOWN)

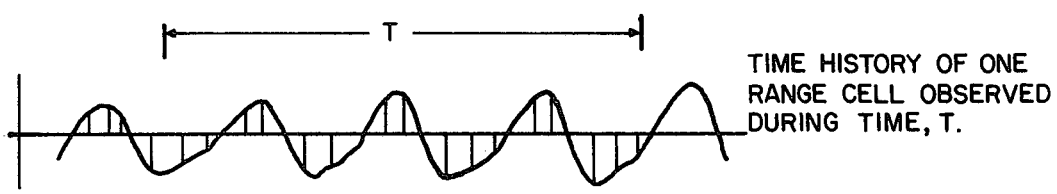

TIME HISTORY OF ONE RANGE CELL OBSERVED DURING TIME, T.

*FIG. 4*

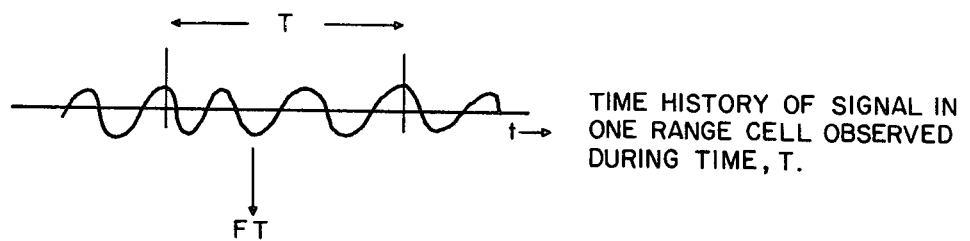
TIME HISTORY OF SIGNAL IN ONE RANGE CELL OBSERVED DURING TIME, T.
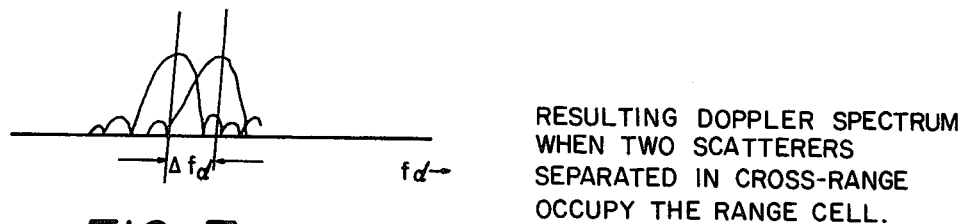
RESULTING DOPPLER SPECTRUM WHEN TWO SCATTERERS SEPARATED IN CROSS-RANGE OCCUPY THE RANGE CELL.
FIG. 7
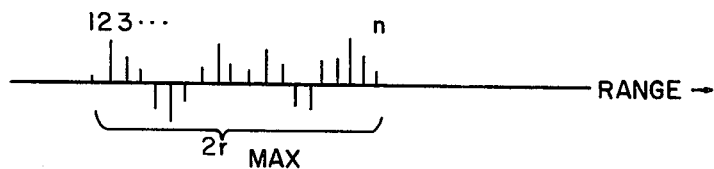
FIG. 8
SAMPLED ECHO SPECTRUM (ONE BURST)
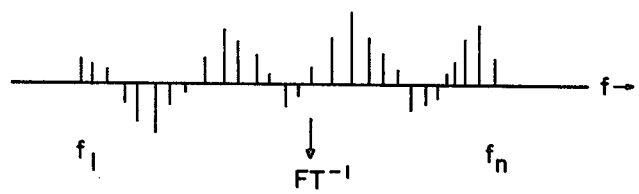
UNAMBIGUOUS TIME PROFILE (SYNTHETIC RANGE PROFILE)
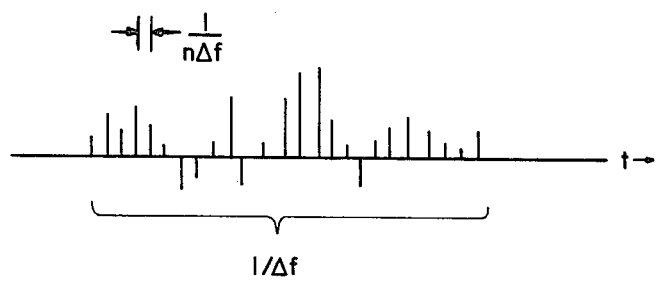
FIG. 9

STEPPED FREQUENCY RADAR TARGET IMAGING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of radar and more specifically to radar imaging apparatus and techniques. Synthetic aperture radar (SAR) ground mapping has been developed and used quite effectively for many years to produce high resolution ground maps. In general, this is accomplished by using the aircraft motion to synthetically produce a large effective antenna aperture in cross-range by coherently integrating the signal return. All relative motion between the SAR platform and target must be eliminated or compensated except for the straight line target flight path. The SAR thus requires complex target motion compensation and is unable to image well on a moving target. A variation of this technique is called Inverse Synthetic Aperture Radar (ISAR), and it can be used to image targets in motion. The radar may be moving or stationary and radar to target motion provides the cross-range image dimension. Individual scatterers on the target are resolved in slant-range by use of relatively large bandwidth waveforms and in cross-range by coherent integration of the signal returns. ISAR has been demonstrated using coherent high range resolution radar against ships and against space objects and air targets. Unfortunately, there are very few operational radars existing or planned for development which possess adequate instantaneous bandwidth to achieve the required range resolution. Further, the required sampling rates are extremely high. Range resolution is now limited by available analog to digital conversion speeds.

SUMMARY OF THE INVENTION

The present invention overcomes the disadvantages of prior SAR and ISAR techniques by utilization of a frequency stepping approach to ISAR which does not require large instantaneous bandwidth though it does require the equivalent operating bandwidth. The sampling rates required by the present invention are low and do not limit resolution. The required bandwidth is a function of required image quality, but the bandwidth required for most applications is 200-450 MHz. The present invention thus provides a means to classify noncooperative targets at full radar range using relatively unsophisticated radar equipment and requiring relatively minor radar equipment modifications. This is accomplished by using frequency agile waveforms to obtain two-dimensional radar images and targets. In accordance with the present invention, air, surface and space targets can be imaged in real time at full radar range from a fixed or moving radar platform using narrow band radar signal processing techniques.

In accordance with the present invention, identification of noncooperative targets is accomplished by inverse synthetic aperture imaging techniques using waveforms suitable for a wide range of existing and planned radars. As in conventional ISAR techniques, target images are developed from target translation and rotation motion relative to the radar platform. However, frequency agile waveforms are used for compatibility with most radar designs which do not usually include wide instantaneous bandwidth. Target range (also referred to as slant-range) and target cross-range (measured orthogonal to the line-of-sight) dimensional information is produced from radar echos containing amplitude and phase data from individual scatterers on the target. Relative range location of the target scatterers is derived by transforming the wideband echo spectrum to target range profile. The cross-range scatterer positions are then extracted from the relative Doppler velocity of the target scatterers produced by the targets rotational motion. Range plus cross-range data are then processed together to form the target image. Finally, target recognition algorithms maybe applied. Conventional digital techniques and software can be used to form images and carry out automatic recognition.

The technique and apparatus of the present invention is denoted as stepped frequency imaging. Stepped frequency refers to pulses stepped in frequency pulse-to-pulse over a large bandwidth. The resulting target echos are transformed into synthetic target range profiles. A time history of synthetic range profiles for a target with changing aspect contains Doppler frequencies associated with each range cell and directly related to target scatterer cross-range location. Range and cross-range Doppler data are mapped into a target image. The frequency stepping process performed by the present invention is summarized as follows:

(1) Transmit a coherent pulse-to-pulse frequency stepped waveform in a continuous series of bursts, n pulses per burst, N bursts per image frame. Separate the radar echo signals into in-phase and quadrature-phase (I and Q) components.

(2) Store the n echo signals from each pulse burst. This is the target spectral signature (for burst time relative to target fluctuation time).

(3) Take an inverse Fourier Transform ($FT^{-1}$) of each frequency burst to obtain an n elements synthetic range profile signature of the target, one range profile for each burst.

(4) Align a time history of the N range profiles, one from each burst in range and Doppler.

(5) Take a Fourier Transform of each range cell (one through n) of the N range profiles in time history for a time period T. Resulting Doppler frequencies of each individual range cell are proportional to the scatterer cross-range location in the range cell.

(6) Process both the range and cross-range data obtained in the above steps together with target position and tracking data to produce a two dimensional image of the target.

(7) Apply two dimensional pattern recognition algorithms for target classification.

OBJECTS OF THE INVENTION

Accordingly, it is the primary object of the present invention to disclose radar target imaging apparatus which does not require large instantaneous bandwidth.

It is a concomitant object of the present invention to disclose an apparatus utilizing stepped frequency waveforms to obtain targets' spectral signatures.

It is a further object of the present invention to disclose an apparatus for enabling radar target imaging that is compatible with existing radars.

It is another object of the present invention to disclose an apparatus enabling radar target imaging that requires neither wide instantaneous bandwidth nor high sampling rates for ISAR imaging.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 4 is a graphical representation of waveforms associated with the target imaging process of the present invention.

FIG. 7 is a graphical illustration of the time history of a signal in one range cell of the present invention and the resulting Doppler spectrum when two scatterers separated in cross-range occupy the same range cell.

FIG. 8 is a graphical representation of either the phase or quadrature channel of exemplary n range quantities obtained from the inverse Fourier Transform of the n echos from one burst of the present invention.

FIG. 9 of the relationship between the inverse Fourier Transform of a sampled echo spectrum in the resulting time domain.

BRIEF DESCRIPTION OF THE PREFERRED EMBODIMENT

Figure 1:
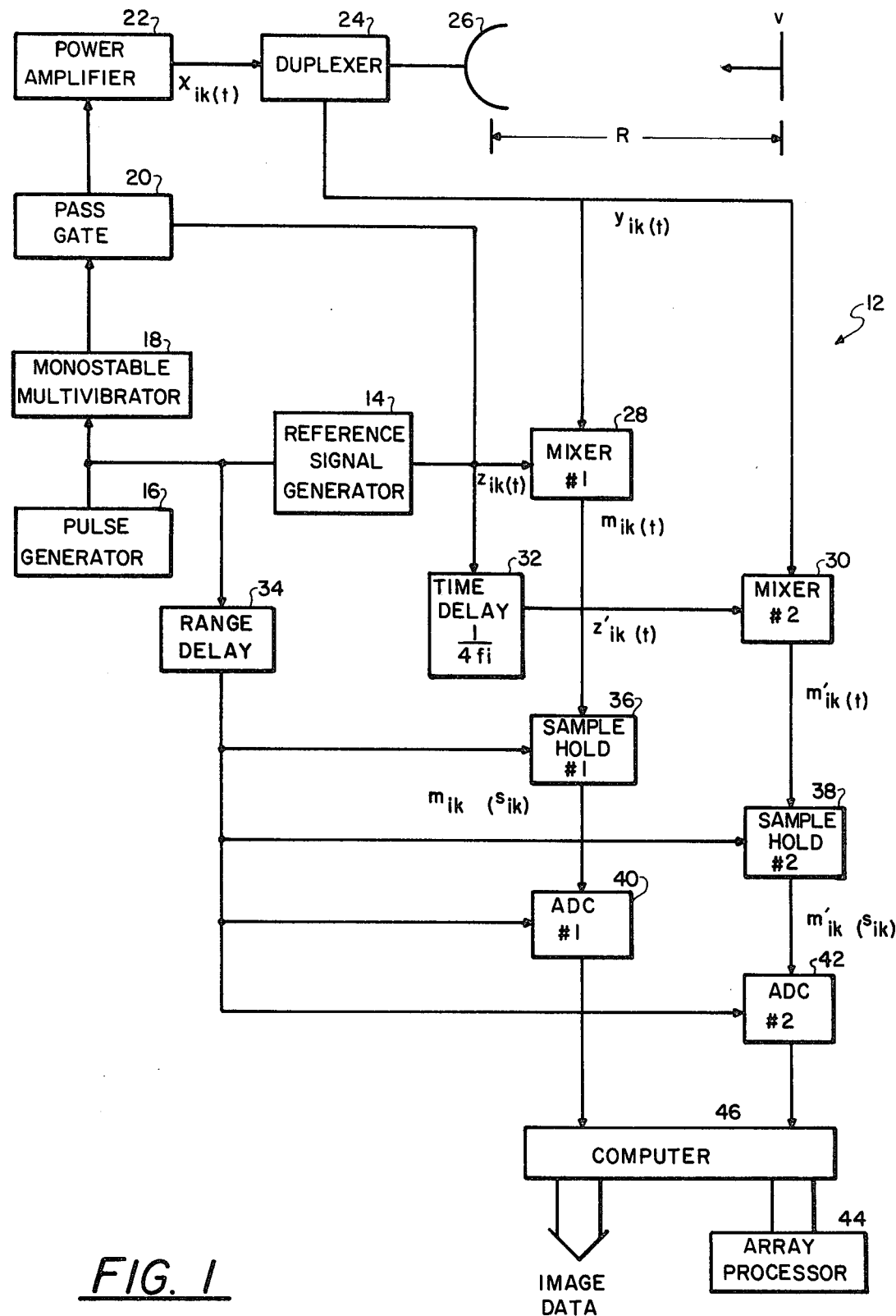
FIG. 1 is a block diagram of the frequency stepped imaging radar of the present invention.
Figure 2A:
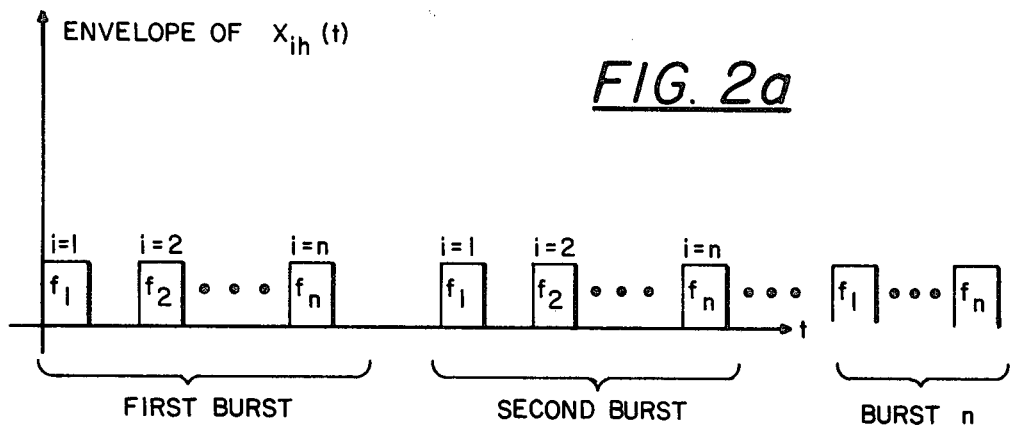
FIG. 2a is a schematic representation of the transmitted signal of the present invention plotted in terms of amplitude versus time.
Figure 2B:
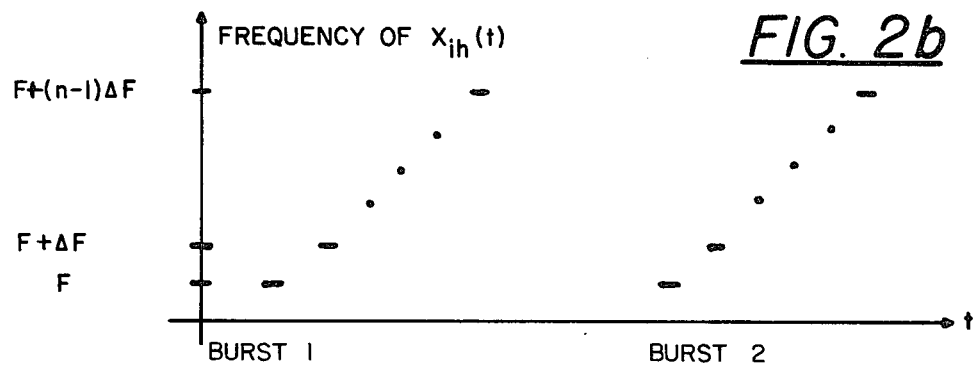
FIG. 2b is a schematic representation of the transmitted signal of the present invention plotted in terms of frequency versus time.
Figure 2C:
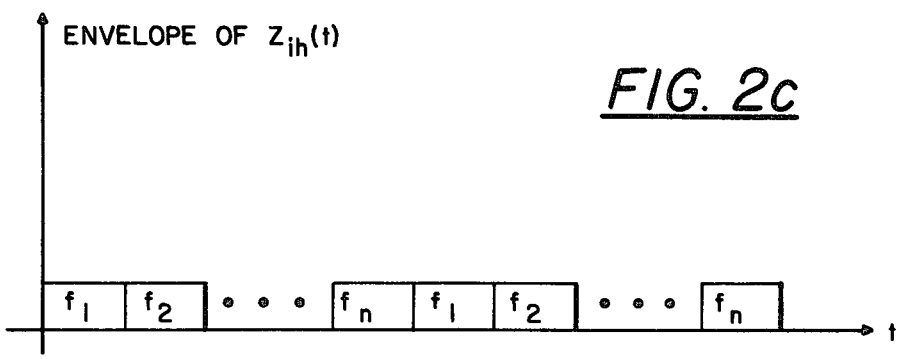
FIG. 2c is a schematic representation of the reference waveform of the present invention showing segments of the reference waveform and showing the stepping nature of the reference waveform plotted in terms of amplitude versus time.

A block diagram of the frequency stepped imaging radar 12 of the present invention is shown in FIG. 1. At the heart of the frequency stepped imaging radar 12 of the present invention is a reference signal generator 14. Reference signal generator 14 is comprised of a frequency synthesizer as is well known. Reference signal generator 14 receives clock pulses from pulse generator 16. Reference signal generator 14 is set such that at the beginning of each burst, as described further below, it transmits a signal at frequency $f_1$. Each time a pulse is received by reference signal generator 14 from the pulse generator 16, the reference signal generator 14 steps to a new frequency separated by $\Delta f$ from that of the previous transmission $f_i$. The reference signal generator 14 thus steps to a new frequency upon the receipt of each pulse from the pulse generator 16 until the end of the burst period. Further, the reference signal generator 14 is set such that at the initiation of the second burst cycle, reference signal generator 14 recycles such that it again begins transmitting a series of stepped frequency pulses beginning again at $f_1$ and stepping up in frequency in identically the same manner as for burst 1. This action is illustrated in the waveform of FIG. 2c. Pulse generator 16 is comprised of a standard frequency unit and digital divider circuits as is well known. All radar timing of the stepped frequency radar 12 is derived from the pulse generator 16. It is not required that the signal generator 14 step up in uniform frequency steps. The required frequencies $f_i$ within a burst can be generated in any order as long as $f_i = f_1 + (i-1)\Delta f$.

Monostable multivibrator 18 defines the on time for each radar transmit cycle. The pass gate 20 allows the RF energy of the reference signal generator 14 to pass through it at the time defined by the monostable multivibrator 18. This action basically forms the transmitted radio frequency pulse. The power amplifier 22 raises the power to the level necessary to transmit the signal to the required level to achieve the required radar range. The duplexer 24 is a radio frequency switch, as is well known, that allows the transmitted pulse to be transferred to the antenna 26 and then radiated into space and also allows echos from the target to be transferred back from the antenna 16 to the receiver portion of the radar 12. The waveforms transmitted by pass gate 20 to power amplifier 22 are illustrated in FIGS. 2a and 2b which show that there are transmitted a series of N bursts, each burst comprising a series of n stepped frequency pulses.

The target echos are received by radar antenna 26 and transmitted via duplexer 24 to the mixer networks 28 and 30. Mixer 28 also receives an input from reference signal generator 14 and, likewise, mixer 30 receives an input from reference signal generator 14 via time delay network 32. Time delay network 32 delays the reference signal generator 14 output to shift the phase by 90°, i.e. by the time delay $\frac{1}{4}f_i$ in order to achieve quadrature mixing. The output of mixer 28 therefore is proportional to the in-phase component (I) of the target echo and the output of mixer 30 is proportional to the quadrature component (Q) of the target echo. The output of the two mixers 28 and 30 together represent a coherent sample of the target echo, i.e. the phase relation of the target echo is retained relative to the transmitted signal. A coherent echo sample is received for each of the n frequency steps in the burst sequence as illustrated in FIGS. 2a through c. This burst sequence is represented for N bursts to complete one image frame of the target.

The range delay unit 34 is comprised of a range tracker such as the range tracker disclosed in U.S. Pat. No. 4,217,581 issued on Aug. 12, 1980 to Michael J. Prickett and incorporated herein by reference. The range delay unit 34 senses any change in the range of the target, as for example, by common early/late gate techniques. The delayed version of the pulse generator 16 output formed by range delay unit 34 is used to sample the in-phase and quadrature (I, Q) signals at the instant that the target echo return signal is at the output of the respective mixers 28 and 30. Sample and hold circuits 36 and 38 receive their trigger inputs from the range delay unit 34. At the time of the trigger to the sample and hold circuits 36 and 38, the sample and hold circuits 36 and 38 will capture the voltage amplitude of the I and Q signal components from mixers 28 and 30, respectively, and hold them constant for an adequate time for the analog to digital converters 40 and 42, respectively, to convert the analog voltage of the I and Q signals to a digital format.

The digital I and Q signals from the outputs of analog to digital converters 40 and 42 are stored into a common digital memory array processor 44 in conjunction with computer 46. Two common mathematicl operations are performed on the I and Q signals; the square root of the sum of the squares of these signals is taken in order to obtain the echo amplitude and the arctangent of the ratio of the Q and I components is calculated in order to obtain the target echo phase relative to the phase of the transmitted radar signals. The amplitude and phase (A/Q) for each of the n frequency steps over all N bursts are calculated and stored in the digital memory array processor 44. This array of amplitude and phase components constitutes the spectral target signature and is illustrated in array form in the upper left-hand corner of FIG. 3.

Computer 46 is programmed to act in conjunction with array processor 42 to determine the inverse Fourier Transform for each frequency burst in order to obtain an n element synthetic range profile. This inverse Fourier Transform array is illustrated in the upper right-hand corner of FIG. 3. Thus, n frequency step elements are transformed to n range cell elements for each of the N bursts.

The target imaging process requires some target rotation relative to the radar to create cross-range resolution. This effective rotation is usually accompanied by undesirable translational motion that must be compensated out. Radar range/Doppler tracking data can be used for course motion compensation. Fine motion compensation can be achieved, by at least two methods, by scatterer point referencing or by the method of tracking the target centroid. With scatterer point referencing a strong return from some scatterer is tracked to phase compensate other scatterers to remove the Doppler effect. Tracking the target centroids so that the target scatterers average Doppler is zero is another method of estimating target motion and range. The Doppler of the target centroid is calculated by averaging the scatterers over all range bins. With centroid tracking, it is the overall target and not any particular target scatterer which is tracked to do the motion compensation. After target motion compensation, the time history of the N range profiles, one for each bursts is aligned. Computer 46 is suitably programmed to perform this function.

Figure 3:
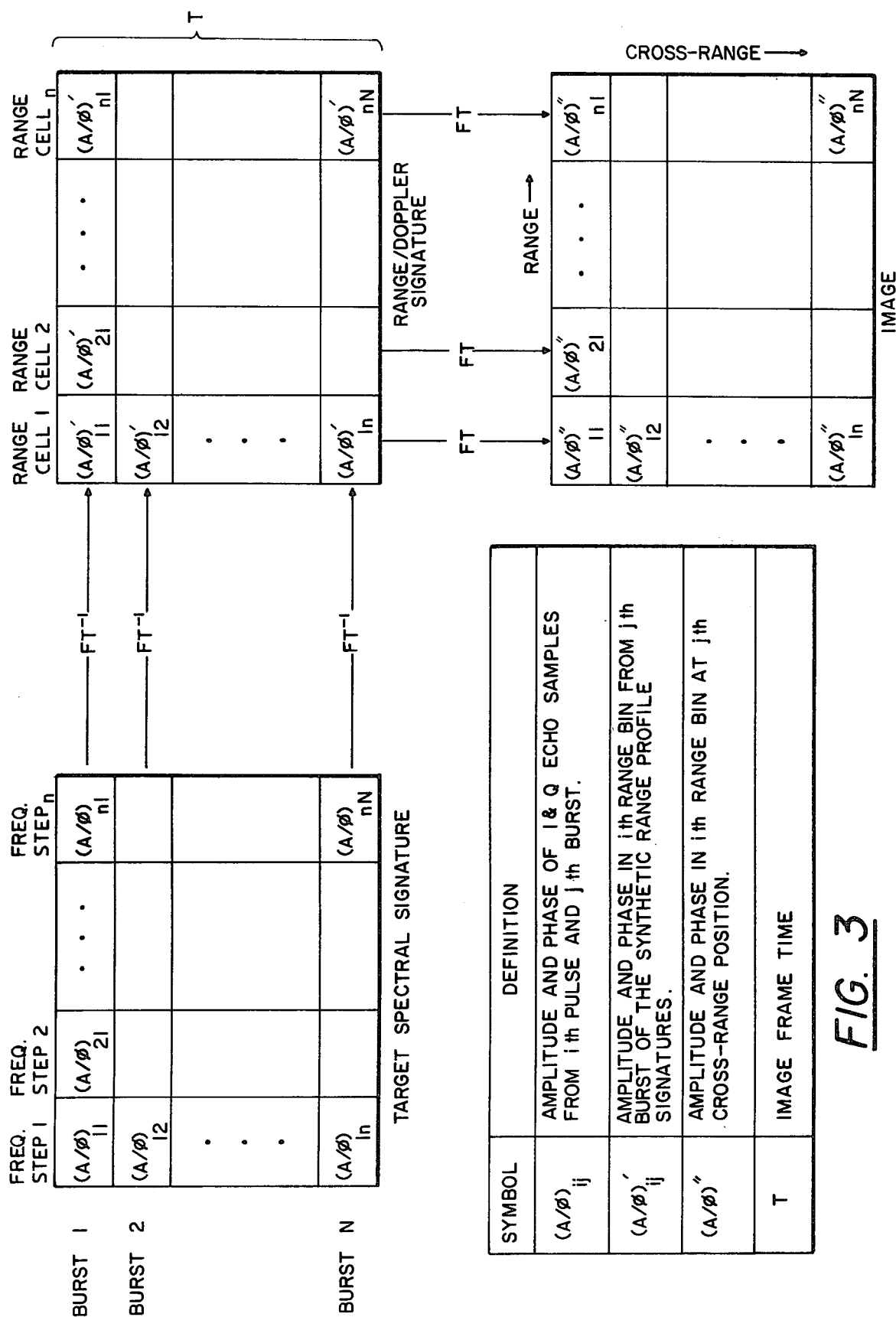
FIG. 3 is an illustration of the sequence of processing steps utilized to form an image frame in accordance with the present invention.
Figure 5:
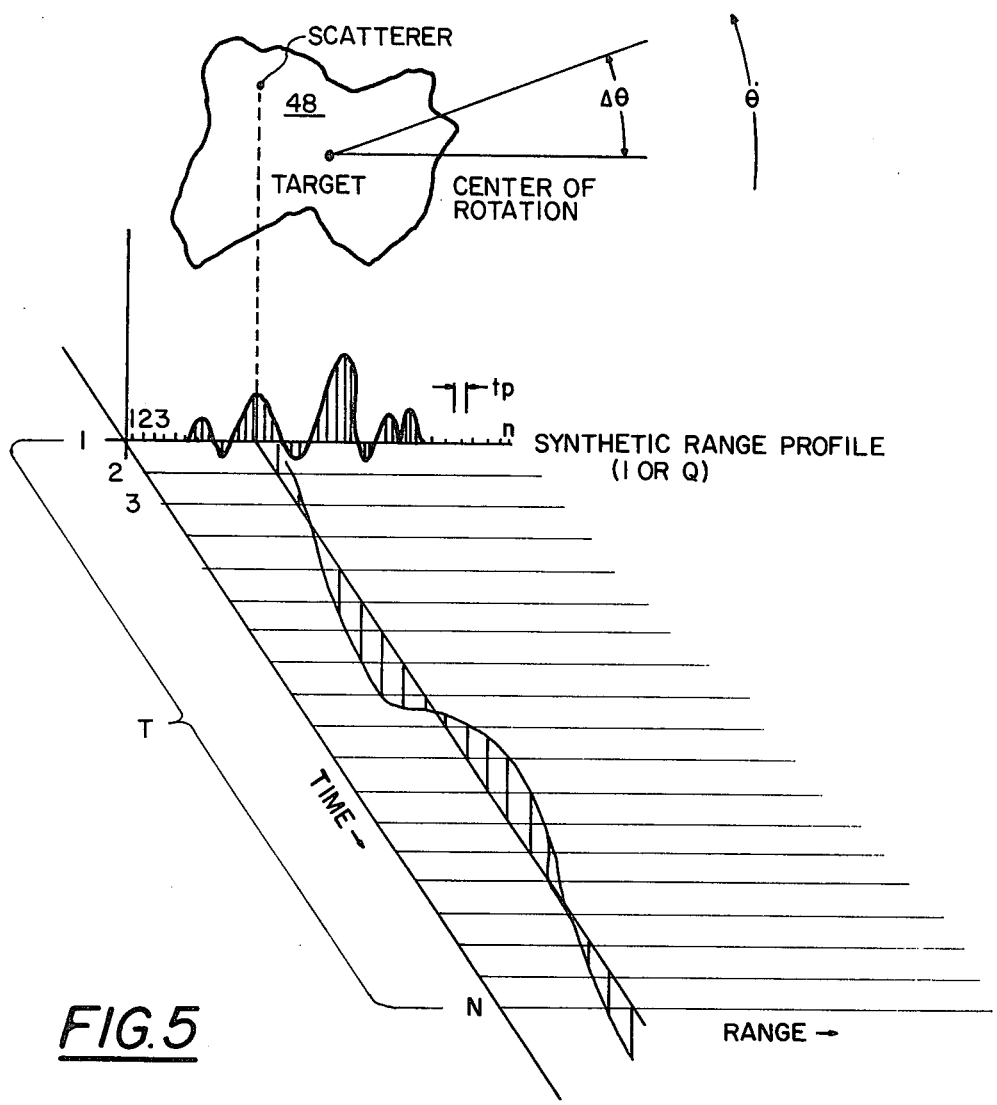
FIG. 5 is an illustration of a rotating target observed with a frequency stepped radar in accordance with the present invention and also an illustration of a series of synthetic range profiles produced in accordance with the present invention.

A Fourier Transform is next performed by computer 46 for each range cell (one through n) of the N range profiles in time history of the time period T. This process is illustrated in FIGS. 3 and 5. The resulting Doppler frequencies of each range cell are proportional to the scatterer cross-range locations in the range cells.

After the Fourier Transform is performed for each range cell as described above, the phase information is removed but the amplitude information is retained by means of suitable programming of computer 46. The array element amplitude and relative position in the range and cross-range dimensions thus defines the target image.

To recapitulate the operation of the present invention, a series of transmitted pulses stepped in frequency from $f_1$ to $f_n$ is defined as one burst. Bursts are repeated continuously during the target dwell time. Time separation between bursts may or may not exist depending upon application and radar design. Echos from the series of N bursts are observed during a target image frame from time T also referred to as the integration time. Each of the N bursts results in a target spectral signature made up of n in-phase and quadrature phase samples corresponding to n amplitude and phase measurements of the target. After digitizing, each of the N spectral signatures is inverse Fourier Transformed to a synthetic range profile signature. The series of N range profile signatures is Fourier Transformed again in time history, range cell by range cell, to obtain the Doppler spectrum for each range cell. The resulting Doppler frequencies in each range cell are proportional to the targets angular rate of aspect change relative to the radar and to the scatterer cross-range location in the range cell relative to an arbitrary aspect rotation axis. Uniform step increases have been used in the drawings for purposes of illustration although it is to be understood that actual transmitted bursts may consist of a series of pulses with nonuniform, but harmonically related, frequency steps or a pseudo random sequence of frequencies, i.e. frequency agility.

FIG. 5 shows a rotating target 48 observed with a frequency stepping radar 12 producing a series of synthetic range profiles as described above and in FIG. 4. One of the I or Q channels of the synthetically generated elements of range profiles is illustrated in FIG. 5. Sequential video profiles are sampled in time history. During a time period T the range cell corresponding to the scatterer shown produces a rotating voltage vector which produces a few cycles of Doppler frequency during time T. Only one range element is shown in time history. Doppler is also produced for other range elements corresponding to other scatterers. During time T, in the present example, the target rotated through $\Delta\theta$ radians. The Doppler frequency for a given range cell is proportional to the target rotation range and the cross-range distance to the target center of rotation of the scatterer in that cell. Thus, for each range cell there is a Doppler frequency proportional to relative cross-range distance. A target image can therefore be mapped in range and cross-range. The target track data is needed to estimate rotation rate and rotation axis alignment. Rotation rate calibrates target cross-range size. Rotation axis establishes the image plane.

Figure 6:
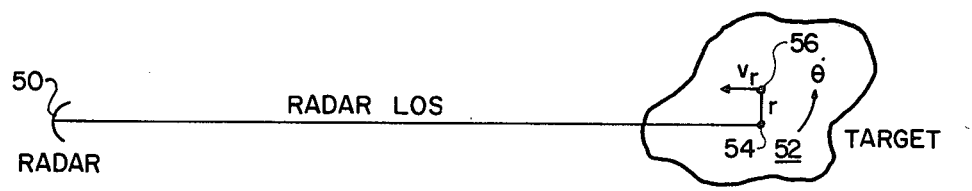
FIG. 6 is an illustration of the basic relationship between target motion and resulting cross-range Doppler.

The basic relationship between target motion and resulting cross-range Doppler is shown by reference to FIG. 6. Both the radar 50 and the target 52 are stationary for simplicity in this example. The target 52 is shown to have a rotation $\theta$ about a fixed axis perpendicular to the plane of the paper at point 54. Radar and radar line-of-sight (LOS) are in the plane of the paper in this example. A single scatterer 56 is shown at a cross-range distance r from the center rotation producing a velocity $v_r$ toward the radar. The Doppler produced by target rotation at frequency $f_o$ is $$f_d = \frac{2v_r}{c} f_o \quad (1(a))$$

$$V_r = \dot{r\theta}. \quad (1(b))$$

For two scatterers separated in cross-range by distance $\Delta r$ the following relationships exist $$\Delta f_d = \Delta r \dot{\theta} \frac{2f_o}{c} \quad (2)$$

$$\Delta r_c = \frac{\Delta f_d}{\dot{\theta}} \cdot \frac{c}{2f_o} . \quad (3)$$

Cross-range resolution $\Delta r$ is dependent upon how well the frequency difference $\Delta f_d$ can be resolved. $\Delta f_d$ is the difference in Doppler frequency provided by two scatterers in the same slant-range cell but separated in cross-range by $\Delta r_c$. $\Delta f_d$ in the frequency domain is related to integration time T in the time domain as is indicated in FIG. 7. From FIG. 7, the Doppler resolution of two scatterers is $$\Delta f_d \sim \frac{1}{T} \quad (4)$$

where T is the integration time, i.e. the time interval over which Doppler is observed. The cross-range resolution in terms of integration time then becomes $$\Delta r_c = \frac{1}{T\dot{\theta}} \cdot \frac{c}{2f_o} \quad (5)$$

where c is propagation velocity. The cross-range window size, denoted $2r_{max}$ is related to the number N of time history samples. From FIG. 5 it is seen that each range cell is Doppler sampled at a rate of one sample per burst. To sample I and Q at the highest (differential) Doppler rate produced by target rotation $$f_s \geq (f_d)_{max} \quad (6)$$

where $f_s$ is the burst rate. For pulse repetition interval $t_p$ $$f_s = \frac{1}{nT_p} , \quad (7)$$

and $$(f_d)_{max} = r_{max} \dot{\theta} \frac{2f_o}{c} . \quad (8)$$

$r_{max}$ is the maximum cross-range dimension measured from the center of rotation and the quantity $1/T_p$ is the pulse repetition rate within the burst. Therefore, $$\frac{1}{nT_p} \geq 2r_{max} \dot{\theta} \frac{2f_o}{c} , \quad (9)$$

and $$\frac{1}{nNT_p} \geq \frac{1}{N} 2r_{max} \dot{\theta} \frac{2f_o}{c} , \quad (10)$$

since $$\frac{1}{nNT_p} = \frac{1}{T} = \Delta r \dot{\theta} \frac{2f_o}{c} \quad (11)$$

$$N \geq \frac{2r_{max}}{\Delta r} \quad (12)$$

where $2f_{max}$ is defined as the maximum cross-range dimension of targets which can be examined unambiguously with N bursts for a cross-range resolution of $\Delta r$.

Range resolution, $\Delta r_s$, and range window size, denoted $2r_{max}$ are obtained by reference to the inverse Fourier Transform of the spectral signature for one burst. FIG. 8 represents either the I or Q channel of the n range quantities obtained from the inverse Fourier Transform of the n echos from one burst. Range resolution is a function of the radar's bandwidth, $f_n - f_1$. Also, $$\Delta r = \frac{c}{2(f_n - f_1)} \quad (13)$$

and $$f_n - f_1 = \frac{c}{2\Delta r} . \quad (14)$$

For a range window of $2r_{max}$ and the resolution of $\Delta r_s$ the number of range samples required is $$n \geq \frac{2r_{max}}{\Delta r_s} . \quad (15)$$

For quadrature mixing reciprocal of the frequency step size corresponds to the unambiguous target window size. As indicated in FIG. 9, the inverse Fourier Transform of the echo spectrum from one burst with frequency samples $\Delta f$ apart will transform to a maximum unambiguous time domain extent of $1/\Delta f$. The maximum time extent, $1/\Delta f$, corresponds to a range window, denoted $2r_{max}$, of $$2r_{max} = \frac{c}{2\Delta f} . \quad (16)$$

Solving for $\Delta f$ the required frequency step size to obtain a range window $2r_{max}$, $$\Delta f = \frac{1}{2} \frac{c}{(2r_{max})} . \quad (17)$$

Targets larger than $2r_{max}$ will appear folded over with the window when transformed to the range profile domain. Frequency step size can also be expressed as $$\Delta f = \frac{f_n - f_1}{n} \quad (18)$$

where $f_n - f_1$ is the required bandwidth to achieve a range resolution $\Delta r$ and n is the number of frequency steps (samples) per burst to adequately sample a range window, $2r_{max}$.

Figure 10:
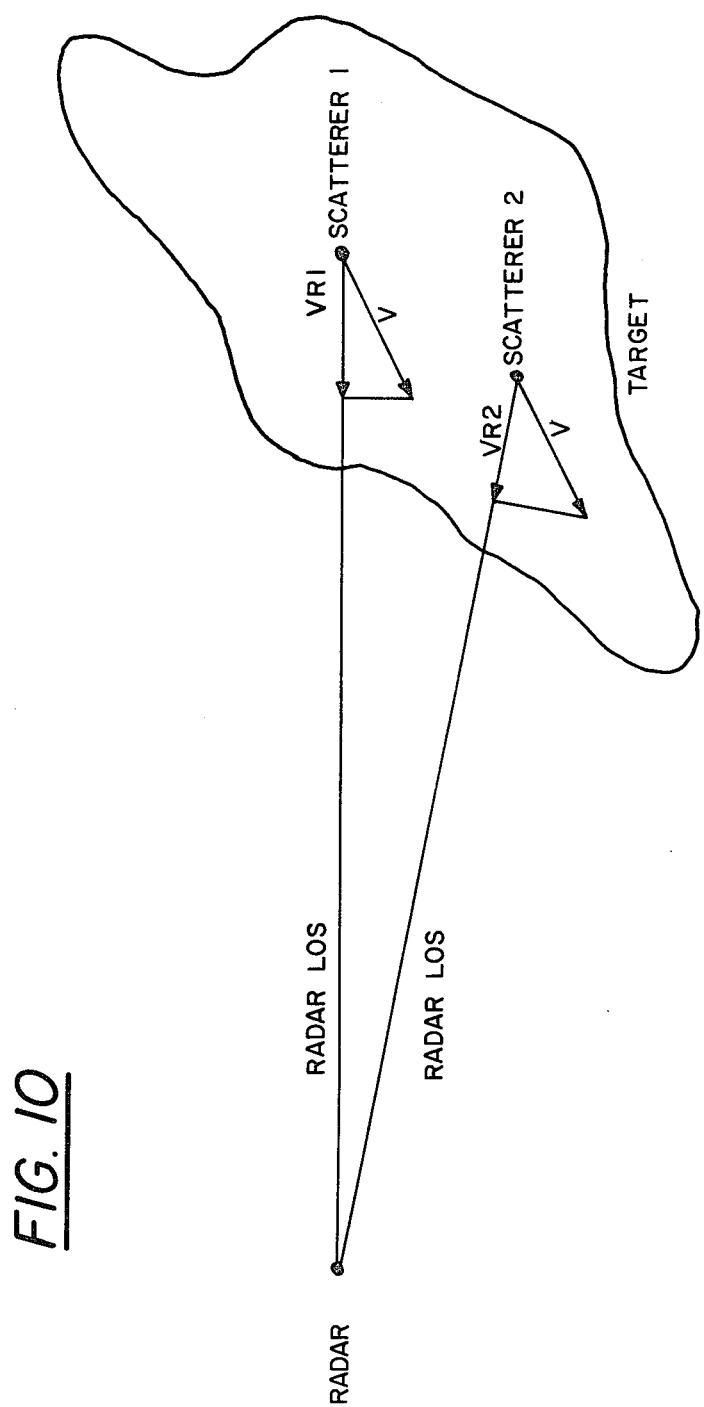
FIG. 10 is a schematic representation of how differential Doppler is produced by a target with some tangential velocity component relative to the radar.

In the above analysis it was assumed there was no translation motion between target and radar. Radial target translation motion relative to the radar superimposes target Doppler on the differential Doppler produced by target rotational motion. Tangential target translation produces an additional differential Doppler component which adds to or subtracts from Doppler produced by target motion. FIG. 10 illustrates how differential Doppler is produced by a target with some tangential velocity component relative to the radar.

The tangential velocity component $v_t$ of the target at target range R produces an angular rotation rate seen by the radar of $$\dot{\theta} = \frac{v_T}{R} . \quad (19)$$

Obviously, many modifications and variations of the present invention are possible in the light of the above teachings, and, it is therefore understood that within the scope of the disclosed inventive concept, the invention may be practiced otherwise than specifically described.

What is claimed is:

1. A device for enabling radar target imaging comprising:
   a pulse generator for generating a series of pulses;
   first means connected to said pulse generator for generating a series of N identical signal bursts, each burst comprising n pulses and each of said n pulses being a different frequency;
   second means connected to said first means for transmitting at least a portion of said series of N identical signal bursts as a radar signal and for receiving a series of radar echos from said radar signal;
   third means connected to said second means for separating said series of radar echos into n in-phase and n quadrature phase components for each of said N bursts;
   means connected to said third means for sampling and holding said n in-phase and n quadrature phase components for each of said N bursts;
   fourth means connected to said sampling and holding means for converting said n in-phase and n quadrature phase components for each of said N bursts to a digital format;
   fifth means connected to said fourth means for calculating and storing the relative amplitude of each of said echos, for calculating and storing the phase of each of said radar echos relative to the phase of the corresponding one of said n transmitted pulses for each of said N bursts, for calculating and storing the n element inverse Fourier Transform of each set of n echo signals resulting from each of said N bursts to thereby generate an $n \times N$ inverse Fourier Transform array having n range cells for each of said N bursts, and for calculating and storing the N element Fourier transform of each of said n range cells.

2. The device of claim 1 wherein:
   said fifth means comprises an array processor having its input connected to said fourth means and a computer connected to said array processor.

3. The device of claim 1 wherein said first means comprises a frequency synthesizer.

4. The device of claim 3 wherein said second means comprises:
   a monostable multivibrator having an input connected to said pulse generator and to said frequency synthesizer and having an output;
   a pass gate having an input connected to said monostable multivibrator output, having an input connected to said first means and having an output;
   a power amplifier connected to the output of said pass gate and having an output;
   a duplexer connected to said power amplifier output; and
   a radar antenna.

5. The device of claims 1 or 4 wherein said third means comprises:
   a first mixer having an input connected to said first means;
   a time delay network connected to said first means; and
   a second mixer connected to said time delay network.

6. The device of claim 5 wherein said fourth means comprises:
   a first sample and hold network connected to said first mixer;
   a second sample and hold network connected to said second mixer; and
   a range tracker connected to said first and second sample and hold networks.

7. The device of claim 6 wherein said converting means comprises:
   first and second analog to digital converters connected to said first and second sample and hold networks, respectively.

8. A device for enabling radar target imaging comprising:
   a pulse generator for generating a series of pulses;
   first means connected to said pulse generator for generating a series of N identical signal bursts, each burst comprising n pulses and each of said n pulses being a different frequency;
   second means connected to said first means for transmitting at least a portion of said series of N identical signal bursts as a radar signal and for receiving a series of radar echos from said radar signal;
   third means connected to said second means for separating said series of radar echos into n in-phase and n quadrature phase components for each of said N bursts;
   means connected to said third means for sampling and holding said n in-phase and n quadrature phase components for each of said N bursts;
   fourth means connected to said sampling and holding means for converting said n in-phase and n quadrature phase components for each of said N bursts to a digital format;
   a computer connected to said fourth means; and
   an array processor connected to said computer.

9. In a radar system including a radar antenna and a transmitter for generating a radar signal, the improvement comprising:
   means connected to said transmitter for generating a series of N identical signal bursts, each burst comprising n pulses and each of said n pulses being a different frequency.

* * * * *